Jan. 26, 1954 J. H. TREVITT 2,667,613
MULTIPLE SPEED MOTOR DRIVE SYSTEM
Filed Nov. 29, 1950
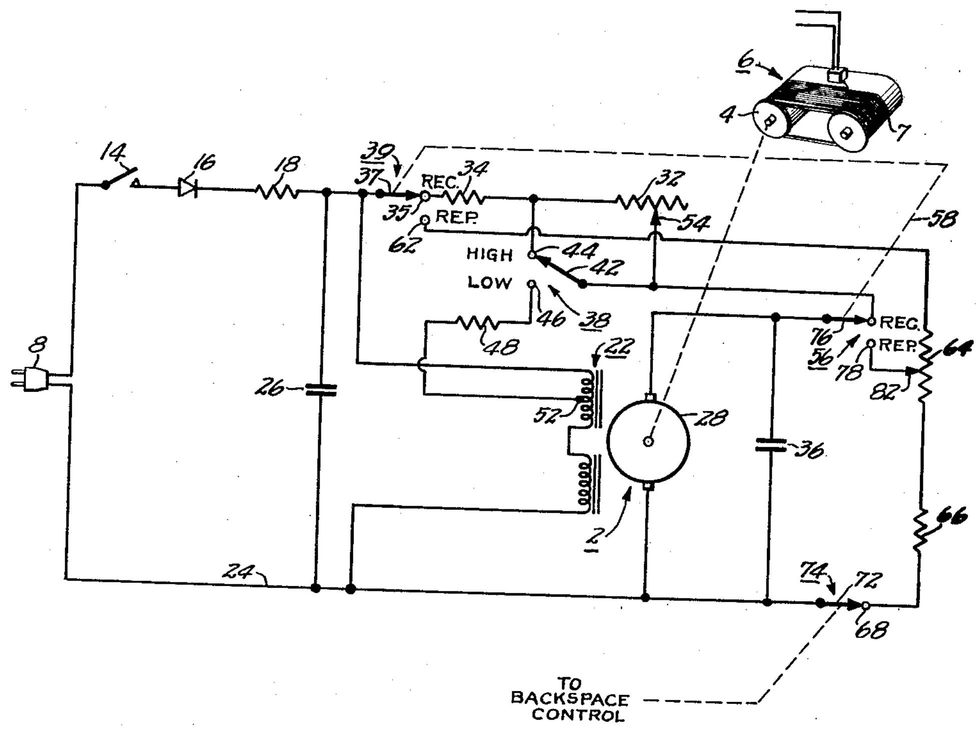
Inventor
JOHN H. TREVITT
By
Curtis, Morris & Safford.
Attorneys Patented Jan. 26, 1954

2,667,613

UNITED STATES PATENT OFFICE 2,667,613

MULTIPLE SPEED MOTOR DRIVE SYSTEM

John H. Trevitt, Bridgeport, Conn., assignor to Dictaphone Corporation, Bridgeport, Conn.

Application November 29, 1950, Serial No. 198,163

11 Claims. (Cl. 318—305)

This invention relates to adjustable speed electric drive systems, and particularly to multiple-speed motor drive systems that can be operated from either alternating or direct current sources and which are especially suited for use in sound recording and reproducing apparatus, such as dictating machines used in business offices.

In such apparatus, it is sometimes desirable to provide a motor drive which is adjustable to operate at two or more pre-set, but constant, speeds. For example, in recording, such a choice of operating speeds is desirable so that on those occasions where maximum recording fidelity is desired, the apparatus can be operated at high speed, whereas when maximum recording time is desired, and fidelity is of less importance, the apparatus can be operated at a lower speed.

However, when reproducing the recorded sound, it is desirable to have a speed control by which the speed of the machine can be varied through a reasonable range of speeds above and below the speed at which the record was made.

In recording, pre-set speeds are sufficient, because the dictator has no occasion to change speeds except to select one suitable to the matter to be recorded, whereas in reproducing, as when an operator is transcribing the recorded dictation, it is necessary to provide continuous speed adjustment over a suitable range so that the speed of the reproducing can be adjusted in accordance with the desires of the operator.

For either recording or reproducing good speed regulation is important, but when recording, it is particularly important that the speed of the drive, once adjusted, remain constant because any change in speed would change the pitch of the recorded signal.

When the system is to be operated from either alternating or direct current, there are several advantages in the use of a D.-C. shunt motor in combination with a special two-stage filtering arrangement as described in the copending application Serial No. 198,162 filed herewith (attorneys' docket 5-6721).

Such an arrangement provides an efficient, compact and entirely satisfactory drive system for single speed operation. However, it is difficult to provide a multiple-speed drive system without sacrificing the good speed regulation provided by the rectifier-filter arrangement shown in the above-mentioned copending application.

For example, governors of the mechanical or electrical-contact type are not satisfactory, because any intentional change in the speed of the machine must be accompanied by an adjustment of this governor, which is difficult to make and usually requires the services of a skilled service man. Moreover, complex speed control and regulating systems, and systems requiring the use of heavy or bulky components, cannot be used because of the limited space available for the motor control equipment in present day dictating machines.

One of the simplest ways of providing speed variation of a shunt-wound motor is by placing a resistance in series with the armature. Such an arrangement is not suitable for use when dictating, however, because the voltage drop across this series resistance changes with variations in the load on the motor and generally causes poor speed regulation.

In accordance with the present invention, an A.-C.-D.-C. motor drive is provided that can be utilized for recording or reproducing. For recording, a two-speed motor drive is provided having, at either of these speeds, a relatively constant speed-load characteristic, that is, changes in load, over a predetermined range, will have no significant effect on the motor speed. For reproducing, the motor drive is arranged to provide continuous variation of the motor speed with relatively constant speed-load characteristics at both the high and low speeds. In addition, a pre-set speed adjustment provides additional power for driving the backspacing mechanism when the machine is being used for transcribing. This speed adjustment is effected by means of a switch that is arranged to be operated by the backspacing control mechanism.

In a preferred embodiment of the invention, the desired constant speed characteristic is achieved at a pre-set reduced speed by a simple interconnecting circuit between the armature winding and a top on the field circuit by which compensating current is fed between the field and armature circuits whereby the motor is caused to operate at a substantially constant speed over a predetermined load range.

Accordingly, it is an object of this invention to provide an A. C.-D. C. motor drive arrangement which can be adjusted to operate at two or more pre-set speeds and having substantially constant speed characteristics at each selected position.

Another object is to provide a simple, compact, and efficient A. C.-D. C. motor drive system in which the speed of the motor can be adjusted continuously over a wide range of speeds, good speed regulation being provided over the higher and lower portions of the speed range.

Still another object of the invention is to provide a driving arrangement for a shunt-wound motor operable for either an alternating or direct current power source and in which increased power is provided by the motor whenever the back-spacing control mechanism is actuated.

These and other objects, advantages, and features of the invention will be in part pointed out in and in part apparent from the following description considered in conjunction with the accompanying drawing which shows diagrammatically a motor driving arrangement embodying the present invention.

As shown, a shunt-wound electric motor, generally indicated at 2, is arranged to drive a mandrel 4 of a belt-type recording and reproducing machine, indicated generally and diagrammatically at 6, for example, of the type described in U. S. Patent 2,318,828 to Yerkovich. When the highest fidelity recording is desired, it is necessary to move the recording medium, in this particular example an endless plastic belt 7, at a relatively high speed, whereas when such high fidelity is not required, the recording medium may be driven at a much lower speed, thus providing a proportionately longer recording time on a given record. However, as mentioned above, it is important that the record be driven at constant speed once the desired speed has been selected, as any change in speed would change the pitch of the recorded signal. When arranged for recording the circuit illustrated is adapted to provide pre-set high and low motor speeds and to provide good speed regulation under both conditions of operation.

This motor 2 can be energized from either alternating or direct current power mains. One terminal of a power supply plug 8, which is connectible to an ordinary wall outlet, is connected through an off-on switch 14, a half-wave dry-type selenium rectifier 16, and a series filter resistor 18 to one terminal of the motor field winding, generally indicated at 22, the opposite terminal of this winding being connected through a lead 24 to the other connection on the plug 8.

An electrolytic filter condenser 26, which together with the resistor 18 smooths the D. C. ripple of the current applied to the field winding 22, is connected in shunt with the field winding 22.

For use in recording, one side of the armature winding 28 of the motor 2 is connected through a commutator and a fixed-position brush, an adjustable resistor 32, a second filter resistor 34, and a fixed contact 35 and a movable arm 37 of a record-reproduce switch, generally indicated at 39, to one end of the first filter resistor 18. The other side of the armature 28 is connected to the plug 8 through the commutator and another fixed-position brush and the lead 24.

A second filter condenser 36, which cooperates with the filter resistor 34 to smooth the current to the armature 28, is connected in parallel with the armature 28.

The special filter-rectifier arrangement described above, in which a rectifier filter system is provided with two successive filter stages only one of which modifies the current applied to the motor field circuit and both of which are effective to smooth the current applied to the motor armature, and the advantages thereof are discussed in greater detail in the above-identified copending application.

In order to provide the desired dual speed operation, a two-position switch, generally indicated at 38, is provided. When arm 42 of this switch is engaged with switch contact 44, the motor 2 operates at its highest speed, the adjustable resistor 32 being short-circuited by the switch 38. When the motor is operating in this manner, the circuit arrangement is similar to that described in the above-identified copending application and good regulation of the motor speed is provided because of the characteristics of this special rectifier-filter arrangement.

When the switch arm 42 is moved so as to engage the switch contact 46, the adjustable resistor 32 is connected in series with the motor armature 28 and the motor operates at its lower speed. However, the additional resistance now in series with the armature 28 tends to cause poorer speed regulation of the motor. In order to improve the regulation of the motor, under the latter operating condition, one side of the armature winding 28 is connected through the switch contact 46 and a fixed resistor 48 to a tap 52 on the field winding 22.

With this arrangement, a constant speed characteristic is obtained at the load where the voltage between power lead 24 and tap 52 is equal to the voltage across the armature 28, with no current flow through the resistor 48. An adjustable tap 54 on the resistor 32 is positioned so that this condition exists under the desired operating conditions.

Thus, with the motor operating at the predetermined load, no current will flow through the resistor 48 between the filter and armature circuits. However, if the load increases, the armature current will increase and the voltage across the armature will decrease. Current, therefore, will flow from the field-winding tap 52 through the resistance 48 and the armature 28. This current decreases the field flux and increases the armature current, both of which tend to increase the speed of the motor, and thus compensate for the increased load.

If the load is reduced from the predetermined operating point, the current through the armature 28 will decrease and the voltage across the armature will increase, so that current will flow from the armature circuit through the resistor 48 into the field winding, thus increasing the field flux and decreasing the armature current, both of these changes tending to reduce the speed of the motor and compensate for the reduction in the load of the motor.

The lower speed operating point is selected, by adjustment of tap 54 on resistor 32, so that the speed remains relatively constant with variations in torque over the desired range. The resistor 48 is provided only for protection in the event that the motor is operated under abnormal conditions and may be eliminated if desired, connection being made directly from switch contact 46 to the field winding tap 52. The current through this resistor, if any, is usually small so that there is but little voltage drop across it.

If additional fixed operating speeds are desired, additional taps on the field winding 22 and on the resistor 32 can be provided, the respective field-armature connecting circuits being completed through additional contacts on the switch 38.

In transcribing, a variable speed control must be provided so that the operator can adjust the machine to the desired transcription speed, and the range of speed variation should be sufficient to encompass both operating speeds of the recording apparatus.

To condition the motor drive system for reproducing, the above-mentioned record-reproduce switch 39 and a second record-reproduce switch, generally indicated at 56, both of which are shown in the recording position, are moved to their alternate, i. e. reproducing, positions. These switches are ganged, as indicated by the broken line 58, so that they can be operated conveniently from a single control. The switch 38, and the resistors 32 and 34, are now effectively out of the circuit.

A voltage divider circuit extends from switch contact 62 through a speed-control potentiometer 64, a fixed resistor 66, and a fixed-contact 68 and movable arm 72 of a backspacing control switch, generally indicated at 74, whose purpose will be explained later, to the power supply lead 24. One side of the armature 28 is connected through the movable arm 76 and fixed contact 78 of the switch 56 to the adjustable tap 82 of the potentiometer 64.

Because this drive system is for use in the transcription of records which were recorded at either of two fixed speeds, the motor 2, in reproducing, will ordinarily be operated near its highest speed or near its lowest speed, depending upon which of the two recording speeds has been utilized, and it is desirable, therefore, that the motor have good regulation over the highest and lowest portions of its speed control range. Such regulation is provided by the arrangement shown. In the speed range near the highest speed of the motor, the resistance of that portion of the potentiometer 64 which is in series with the armature circuit is very small so that good speed regulation is provided. When the motor is operating in the range of speeds near its lowest speed, the resistance which is introduced into the armature circuit by the potentiometer 64 will be high relative to the change in resistance of the armature circuit 28, but the portion of the potentiometer resistance, together with the resistance of resistor 66 which is low in value, that is in shunt with the armature 28 will be relatively small, so that the voltage across the armature remains substantially constant, and the motor speed, accordingly, remains reasonably constant irrespective of changes in the load on the motor.

In order to provide sufficient power for operating the backspacing mechanism of the reproducing machine, irrespective of the setting of the speed-controlling potentiometer 64, the arm 72 is arranged to be moved between open and closed positions by the backspace control mechanism (not shown) of the transcribing machine, so that increased power is developed automatically whenever the machine controls are manipulated for backspacing. Thus, a power driven backspacing mechanism, such as is described in the above-identified Yerkovich patent, is driven by the increased power of the motor 2 without altering the setting of the potentiometer 64. Thus, when the operating control to initiate the backspacing operation is manipulated, the switch 74 is opened, thereby opening the circuit in shunt with armature 28 and decreasing the current through the portion of potentiometer 64 which is in series with the armature 28, thereby applying increased voltage to the armature.

In recording apparatus and in various other machines, the motor must be quiet, small in size, and must not cause any electrical interference in the high gain amplifiers utilized in the recording apparatus. Quietness of the motor is best obtained by operating the motor at a low speed in order to reduce the brush noise. However, low speed and small size of the motor usually require a larger number of turns in the armature with a correspondingly high armature resistance. This high armature resistance generally makes the motor more sensitive to changes in load, and poor speed regulation results. This disadvantage of high armature resistance preferably can be overcome by the use of a special motor in which a very low armature current is utilized. In one such motor an armature voltage drop of less than 5 volts is produced for an input voltage of 115 volts, that is, the armature winding develops 110 volts counter-electromotive force. This desirable characteristic is obtained by shaping the armature laminations to obtain a much smaller coil space and a much larger iron path than is usual in small size motors and by providing an extremely strong field flux. In a 3 watt motor, for instance, the armature current, under operating conditions, is 15 milliamperes, while the field current is 60 milliamperes. Thus, even with an armature resistance as high as 300 ohms, there is only a 4.5 volts drop caused by the armature resistance. The high field strength and the low armature current assist in preventing electrical interference in the high gain amplifier. The armature current is so low that the commutation of this current does not cause sparking at the motor brushes. Also, this relatively high armature resistance helps to damp out any oscillating currents which may occur in the coils that are shorted during commutation. Although the features of the present invention are applicable to motors constructed in the conventional manner, additional advantages are obtained if the motor is designed so that the field current is at least twice as great as the current through the armature.

It is thus seen that in accordance with the ends and objects hereinbefore set forth, a compact and efficient multiple-speed motor drive system has been provided. Such a motor drive arrangement is suitable for use where a single type of apparatus is used both for dictating and for transcribing, and is therefore desirable as a standardized system for use in machines that are especially adapted for recording as well as those especially adapted for reproduction.

It is to be understood that the particular embodiment of the invention will be modified to best suit it to each particular use. Certain features of the invention may be used to advantage without a corresponding use of other features, and additional circuit arrangements, for example such as are described in the above-identified copending application, may be added to the arrangements described herein.

I claim:

1. A multi-speed motor drive system comprising a source of direct voltage, a shunt-wound motor having field and armature windings, said field winding having a tap for making connection thereto at a point between the ends of said winding, first circuit means connecting said field winding to said source, second circuit means connecting said armature winding to said source, a resistor connected in series with said armature, and third circuit means connecting said field winding tap to the juncture of said resistor and said armature winding, whereby a substantially constant load-speed characteristic is produced over a predetermined range of loads.

2. A multi-speed motor drive system comprising a source of direct voltage, a shunt-wound motor having field and armature windings, said field winding having a tap for making connection thereto at a predetermined point between the ends of said winding, first circuit means connecting said field winding to said source, second circuit means connecting said armature winding to said source and including a current resisting element, and third circuit means connecting said field winding tap to said armature winding, said tap being positioned so that the voltage across said armature winding and the voltage between said tap and one end of said field winding are substantially equal under the usual load conditions of said motor, whereby a substantially constant load-speed characteristic is produced over a predetermined range of loads above and below the usual load condition.

3. A multi-speed motor drive system comprising a source of direct voltage, a shunt-wound motor having field and armature windings, said field winding having a tap for making connection thereto at a predetermined point between ends of said winding, first circuit means connecting said field winding to said source, second circuit means connecting said armature winding to said source and including a speed-controlling resistor in series with said armature, and switch means having first and second positions and being arranged when in said first position to short-circuit said resistor and when in said second position to connect said tap to one end of said armature winding, whereby a substantially constant load-speed characteristic is produced over two separate predetermined ranges of loads.

4. For use in sound recording and reproducing equipment and the like adapted for operation from either alternating or direct current, a multi-speed motor drive system comprising a plug connectible to a source of electrical energy, a rectifier and a resistance-capacitance filter network connected to said plug, a shunt-wound motor having field and armature windings, said field winding having a tap for making connection thereto at a predetermined point between ends of said winding, first circuit means connecting said field winding to said source, second circuit means connecting said armature winding to said source and including a resistance in series with said armature, at least one capacitance element of said filter network being connected in parallel with said armature, and third circuit means connecting said field winding tap to one side of said armature winding, whereby a substantially constant load-speed characteristic is produced at reduced speed over a predetermined range of loads.

5. For use in sound recording and reproducing apparatus and the like, a multi-speed motor drive system comprising an input circuit connectible to a voltage source, a selenium rectifier connected to said input circuit, a first filter network having a series resistance element and a shunt capacitance element connected to the output of said rectifier, a shunt-wound motor having field and armature windings, said field winding having a tap for making connection thereto at a predetermined point between the ends of said winding, first circuit means connecting the ends of said field winding to the output of said first filter network, an adjustable resistor connected in series with said armature for controlling the speed of said motor, a second filter section connected to said armature winding and to the output of said first filter section and including a series resistance element and a capacitance element connected in parallel with said armature, and second circuit means connecting said field winding tap to one end of said armature winding, whereby a substantially constant load-speed characteristic is produced over a predetermined range of loads.

6. A dictating and/or transcribing machine adapted to be energized from either alternating or direct current and in which two alternate constant speed adjustments are provided for recording and a continuously variable speed adjustment is provided for reproducing together with a control for increasing the power for operating the backspacing mechanism when reproducing, said machine including a control mechanism for conditioning said machine for power-driven backspacing operation, and a multi-speed motor drive system including an input circuit connectible to an electrical power source, a selenium rectifier connected to said input circuit, a first filter network having a series resistor element and a shunt capacitor and connected to the output of said rectifier, a shunt-wound motor having field and armature windings, said field winding having a tap for making connection thereto at a predetermined point between the ends of said winding, first circuit means connecting said field winding to the output of said first filter network, a second filter section connected to the output of said first filter section and including a series resistance element and a capacitance element connected in parallel with said armature winding, first speed-control switch means having first and second positions, an adjustable resistor connected to said switch means and arranged in series with said armature for reducing the speed of said motor when said first switch means is in said first position, said first switch means being arranged to short-circuit said adjustable resistor when in said second position, second switch means having record and reproduce positions and arranged to render said first switch means inoperative when in said reproduce position, a resistance voltage-divider network including a speed-controlling potentiometer having an adjustable contact and connected to said second switch means and coupled to said first filter section when said second switch means is in reproduce position, said contact on said potentiometer being connected to one side of said armature when said second switch means is in reproduce position, and means under the control of said backspacing control mechanism arranged to open-circuit said voltage divider circuit whenever said machine is conditioned for backspacing thereby to apply increased voltage to said armature.

7. A dictating and/or transcribing machine adapted to be energized from either alternating or direct current and in which two alternate constant speed adjustments are provided for recording and a continuously variable speed adjustment is provided for reproducing together with a control for increasing the power for operating the backspacing mechanism of the reproducing machine, said machine including a control mechanism for conditioning said machine for power-driven backspacing operation, and a multi-speed motor drive system including an input circuit connectible to an electrical power source, a rectifier connected to said input circuit, a filter network connected to the output of said rectifier, a shunt-wound motor having field and armature windings, said field winding having a tap for making connection thereto at a predetermined point between the ends of said winding, first circuit means connecting said field winding to said filter network, a speed-control switch means having first and second positions, an adjustable resistor connected to said switch and arranged in series with said armature for reducing the speed of said motor when said switch is in said first position, said switch being arranged to short-circuit said adjustable resistor when in said second position, third circuit means connected to said switch and arranged to connect said field winding tap to one end of said armature winding when said switch is in said first position, a voltage-dividing network including a potentiometer having a sliding contact, second switch means having record and reproduce positions and arranged when in the reproduce position to render said first switch means ineffective, to connect said voltage-dividing network across said filter circuit, and to connect one side of said armature to said sliding contact, and third switch means under the control of said backspacing control mechanism and arranged to open-circuit said voltage-dividing network whenever said machine is conditioned for backspacing.

8. In a dictating and/or transcribing machine in which a continuously variable speed adjustment is provided together with a maximum power adjustment for operating the backspacing mechanism of the reproducing machine, said machine including a control mechanism for conditioning said machine for power-driven backspacing operation, and a multi-speed motor drive system including an input circuit connectible to an electrical power source, a filter network having a series resistor element and a shunt capacitor and connected to said input circuit, a shunt-wound motor having field and armature windings, first circuit means connecting said field winding to said filter network, a speed-control switch having first and second positions, an adjustable resistor connected to said switch and arranged in series between said armature and said filter network for reducing the speed of said motor when said switch is in said first position, said switch being arranged to short-circuit said adjustable resistor when in said second position, second switch means having first and second positions and arranged to render said first switch means ineffective when in its second position, variable voltage supply means under the control of said second switch means and arranged to supply a controllable voltage to said armature when said second switch means is in said second position, and third switch means under the control of said backspacing control mechanism and arranged to increase the voltage applied to said armature by said variable voltage supply means whenever said machine is conditioned for backspacing.

9. A motor drive system particularly adapted for the operation of either dictating or transcribing machines from either alternating or direct current, said drive system comprising an input circuit connectible to a source of electrical power, a rectifier connected to said input circuit, a resistance-capacitance filter section having a series resistance and a shunt capacitance and connected to the output of said rectifier, a shunt-wound direct current motor having an armature winding and a field winding having a tap connection between the two ends thereof, first circuit means connecting said field winding to the output of said first filter section, a filter condenser connected in parallel with said armature winding, a first armature-energizing circuit comprising a series filter resistance connected in series with said armature winding, an adjustable resistor connected in series with said armature winding and said filter resistor, and a speed-control switch having high speed and low speed positions, said speed-control switch being arranged when in the high-speed position to short-circuit said adjustable resistor and when in said low-speed position to connect said field winding tap to the side of said armature electrically nearest said adjustable resistor, a second armature-energizing circuit comprising a voltage dividing network connected to the output of said first filter section and including a potentiometer having a slidable contact, said armature being connected between said slidable contact and one end of said voltage-dividing network, a record-reproduce switch having first and second positions and arranged when in said first position to connect said armature winding in said first armature energizing circuit and when in said second position to connect said armature winding in said second armature energizing circuit, and a remotely controllable backspacing switch connected in series with said voltage-dividing network.

10. A motor drive system comprising a source of direct voltage, a shunt-wound motor having field and armature windings, said field winding having first and second series-connected portions, a first circuit connecting opposite ends of said field winding to said source, current-resisting means connected in series with said armature winding, a second circuit including said current-resisting means and connecting said armature winding to said source, and a third circuit connecting the junction of said first and second portions of said field winding to the end of said armature winding nearest said current-resisting means.

11. A transcribing machine for reproducing dictation for transcription comprising an input circuit connectible to an electrical power source, a shunt-wound electric motor having field and armature windings, a record media, a reproducing head, forward drive means connectible to said motor for moving said record media, relative to said head along a predetermined sound track, first circuit means connecting said field winding to said input circuit, a voltage-dividing circuit connected to said input circuit and including a resistance element having an adjustable contact arranged to apply a controllable reduced voltage to said armature, said voltage-dividing circuit being arranged to carry a bleeder current throughout its length and an armature current through a portion thereof dependent on the adjustment of said contact, a manually-operable backspacing control mechanism, and switch means under the control of said manually-operable backspacing control mechanism arranged to prevent the flow of significant bleeder current through said voltage-dividing circuit whenever said machine is conditioned for backspacing.

JOHN H. TREVITT.

References Cited in the file of this patent

UNITED STATES PATENTS

| Number | Name | Date |
|---|---|---|
| 1,267,184 | Clark | May 21, 1918 |

FOREIGN PATENTS

| Number | Country | Date |
|---|---|---|
| 17,137 | Great Britain | of 1908 |